United States Patent
Ramsey et al.

(10) Patent No.: US 10,428,922 B2
(45) Date of Patent: Oct. 1, 2019

(54) HYBRID MOTOR VEHICLE DRIVE TRAIN INCLUDING HYBRID MODULE BAFFLE BLADE

(71) Applicant: Schaeffler Technologies AG & Co. KG, Herzogenaurach (DE)

(72) Inventors: John Ramsey, Mansfield, OH (US); Markus Steinberger, Macedonia, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 103 days.

(21) Appl. No.: 15/842,396

(22) Filed: Dec. 14, 2017

(65) Prior Publication Data
US 2019/0186607 A1     Jun. 20, 2019

(51) Int. Cl.
| F16H 41/26 | (2006.01) |
| F16H 41/04 | (2006.01) |
| F16H 45/02 | (2006.01) |
| B60K 6/38 | (2007.10) |

(52) U.S. Cl.
CPC .............. *F16H 41/26* (2013.01); *F16H 41/04* (2013.01); *F16H 45/02* (2013.01); *B60K 6/38* (2013.01); *B60Y 2200/92* (2013.01); *F16H 2045/0215* (2013.01); *F16H 2045/0221* (2013.01); *Y10S 903/912* (2013.01)

(58) Field of Classification Search
CPC ... F16H 57/0423; F16H 57/12; Y10S 903/902
See application file for complete search history.

(56) References Cited

U.S. PATENT DOCUMENTS

| 6,781,272 | B2 * | 8/2004 | Kahlon | B60K 6/26 180/65.25 |
| 8,122,787 | B2 * | 2/2012 | Simpson | F16H 57/0423 74/606 R |
| 8,371,978 | B2 * | 2/2013 | Nobata | F16H 57/0457 475/160 |
| 9,878,706 | B2 * | 1/2018 | Frait | B60W 10/02 |
| 2011/0245010 | A1 * | 10/2011 | Nobata | F16H 57/0457 475/160 |
| 2014/0241912 | A1 * | 8/2014 | Braun | F04D 29/628 417/363 |
| 2015/0166049 | A1 * | 6/2015 | Frait | B60K 6/387 477/5 |
| 2015/0175154 | A1 * | 6/2015 | Frait | B60W 10/02 477/5 |
| 2018/0257475 | A1 * | 9/2018 | Satyaseelan | B60K 6/40 |
| 2019/0048991 | A1 * | 2/2019 | Zhang | F16H 57/0457 |

* cited by examiner

*Primary Examiner* — Thomas E Lazo
(74) *Attorney, Agent, or Firm* — Davidson, Davidson & Kappel, LLC

(57) ABSTRACT

A hybrid module configured for arrangement in a torque path upstream from a transmission and downstream from an internal combustion engine includes a drive unit including an electric motor and a housing, a torque converter connected to the electric motor and at least one baffle blade extending axially from the housing radially outside of the electric motor and the torque converter.

17 Claims, 4 Drawing Sheets

HYBRID MOTOR VEHICLE DRIVE TRAIN INCLUDING HYBRID MODULE BAFFLE BLADE

The present disclosure relates generally to hybrid motor vehicle drive trains and more specifically to altering the fluid flow in hybrid modules.

BACKGROUND

Some hybrid motor vehicle drive trains include a hybrid module including a torque converter running in a wet environment inside the bell housing. The torque converter can create a vortex of oil inside the bell housing, which has been linked to a drag loss on the order of 1 Nm.

SUMMARY OF THE INVENTION

A hybrid module configured for arrangement in a torque path upstream from a transmission and downstream from an internal combustion engine is provided. The hybrid module includes a drive unit including an electric motor and a housing, a torque converter connected to the electric motor and at least one baffle blade extending axially from the housing radially outside of the electric motor and the torque converter.

Embodiments of the hybrid module may include one or more of the following features:

the at least one baffle blade includes a first baffle blade and a second baffle blade, the first and second baffle blades being spaced circumferentially from each other;

the at least one baffle blade includes a base fixed to the housing and a blade portion extending axially from the base;

the blade portion includes a radially outer surface, a radially inner surface and at least one tab extending radially inward from the radially inner surface;

the at least one tab includes a first tab positioned on a transmission facing side of a portion of a rear cover of the torque converter;

the first tab contacts a radially extending wall of the rear cover;

the at least one tab includes a second tab positioned axially between a stator of the electric motor and a portion of a front cover of the torque converter;

the radially inner surface of the blade portion contacts an outer circumferential surface of the electric motor;

the radially inner surface of the blade portion contacts an outer circumferential surface of a cover of the torque converter; or the blade portion includes a circumferentially facing surface extending from the radially inner surface to the radially outer surface.

A method of constructing a hybrid module configured for arrangement in a torque path upstream from a transmission and downstream from an internal combustion engine is provided. The method includes providing a drive unit including an electric motor and a housing; connecting a torque converter to the electric motor; and fixing at least one baffle blade to the housing such that the at least one baffle blade extends axially from the housing radially outside of the electric motor and the torque converter.

Embodiments of the method may include one or more of the following features:

the fixing of the at least one baffle blade to the housing includes fixing a first baffle blade and a second baffle blade to the housing, the first and second baffle blades being spaced circumferentially from each other;

the at least one baffle blade includes a base fixed to the housing and a blade portion extending axially from the base, the blade portion including a radially outer surface, a radially inner surface and at least one tab extending radially inward from the radially inner surface;

the at least one tab includes a first tab positioned on a transmission facing side of a portion of a rear cover of a cover of the torque converter;

the at least one tab includes a second tab positioned axially between a stator of the electric motor and a portion of a front cover of the cover of the torque converter;

the at least one baffle is fixed to the housing such that the first tab contacts a radially extending wall of the rear cover, the radially inner surface of the blade portion contacts an outer circumferential surface of the electric motor and the radially inner surface of the blade portion contacts an outer circumferential surface of the cover of the torque converter;

the blade portion includes a circumferentially facing surface extending from the radially inner surface to the radially outer surface.

BRIEF DESCRIPTION OF THE DRAWINGS

The present invention is described below by reference to the following drawings, in which.

DETAILED DESCRIPTION

The present disclosure provides using at least two small blades for a baffle in the hybrid module. The 3D printed designs were not production feasible. In order to create production feasible designs, a stampable concept for this baffle is provided by the present disclosure. Modal analysis and stampability led to using at least two small blades instead of one large baffle. The blades serve to interrupt the oil vortex while remaining manufacturable with more ease of assembly for production. The interruption of the oil vortex reduce the velocity of the oil, allowing the oil to flow back into the transmission sump.

In an embodiment disclosed herein, the hybrid module includes a right baffle blade and left baffle blade. The baffle blades each have tabs that extend around the torque converter in order to re-direct as much flow as possible. The blades are each fastened to the housing via a flange with bolt holes in the flange. The blade has a formed/stamped contour that redirects the oil flow towards the transmission.

Figure 1:
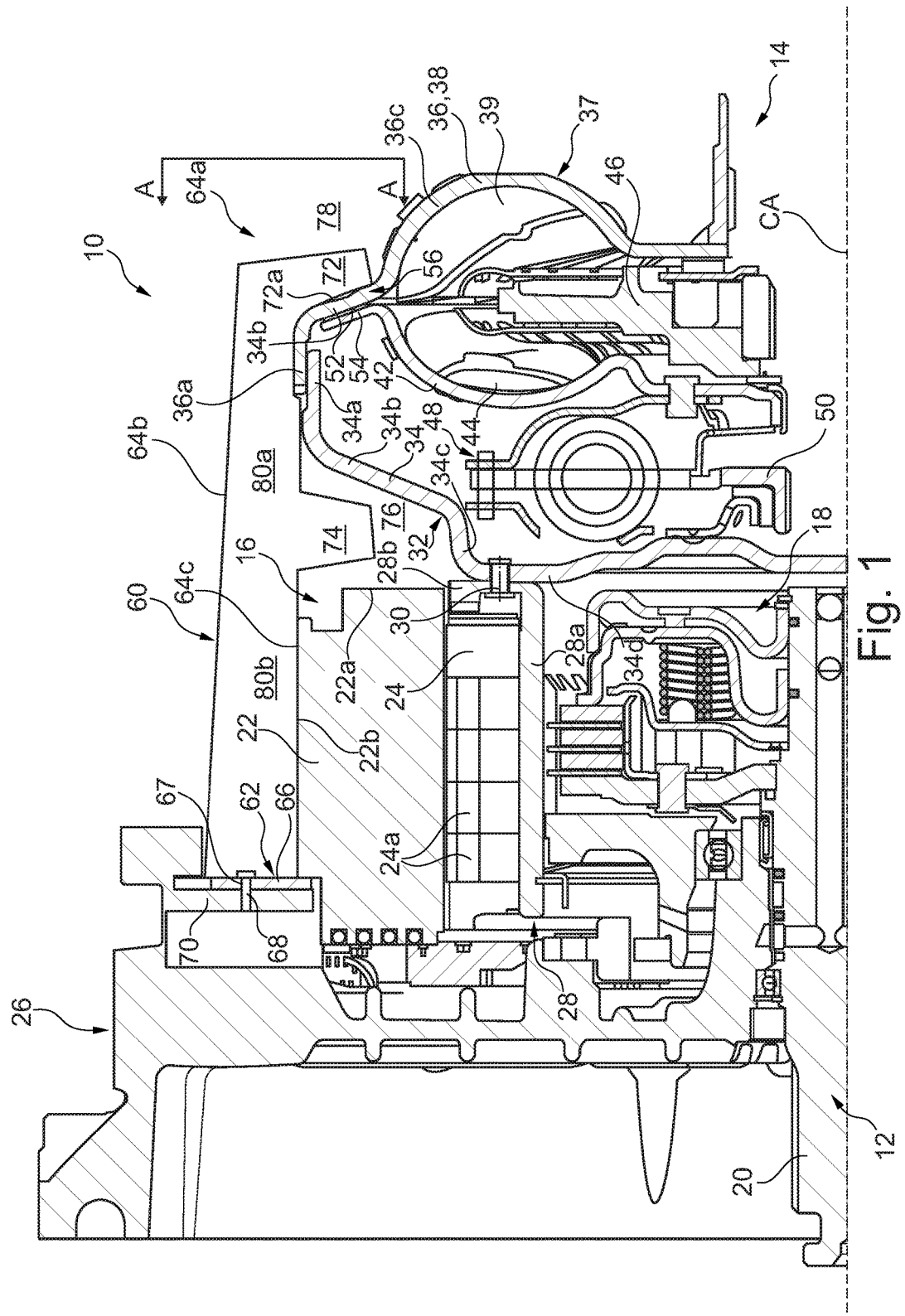
FIG. 1 shows a hybrid module in accordance with an embodiment of the present invention.

FIG. 1 shows hybrid module 10 in accordance with an embodiment of the present invention. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier 28. Rotor carrier 28 includes a cylindrical axially extending section 28a supporting the inner circumferences of magnet segments 24a and a radially extending section 28b protruding radially outward from an end of axially extending section 28a. Torque converter 14 is fixed to hybrid drive unit 12 at radially extending section 28b of rotor carrier 28 by a plurality of fasteners 30 passing through a cover 32 of torque converter 14.

Torque converter 14 includes a front cover 34 and a rear cover 36 together forming cover 32, with fasteners 30 passing through front cover 34. Front cover 34 includes an axially extending portion 34a defining an outermost circumferential surface of front cover 34. Extending radially inward from portion 34a and axially toward drive unit 12, front cover 34 also includes a frustoconical section 34b, which at a radially inner end thereof joins an intermediate axially extending portion 34c. Extending radially inward from portion 34c to center axis CA, front cover 34 further includes a radially extending central portion 34d, which fasteners 30 pass axially therethrough.

Rear cover 36 includes forms an impeller shell 38 of an impeller 37 that includes a plurality of impeller blades 39. Rear cover 36 includes an axially extending portion 36a defining an outermost circumferential surface of rear cover 36. Axially extending portion 36a axially overlaps axially extending portion 34a, with axially extending portion 36a being radially outside of axially extending portion 34a such that an inner circumferential surface of axially extending portion 36a contacts an outer circumferential surface of axially extending portion 34a and portions 34a, 36a are welded together. Extending radially inward from portion 36a and axially away drive unit 12, rear cover 36 also includes a frustoconical section 36b, which at a radially inner end thereof joins an a rounded blade supporting portion 36c, which is shaped as an annular bowl, contacting impeller blades 39.

Torque converter 14 also includes a turbine 40 configured to define a piston that is axially moveable toward and away from impeller shell 38 such that an engagement section of turbine 40 engages an engagement section of impeller shell 38 so as to form a lockup clutch. Turbine 40 includes a turbine shell 42 supporting a plurality of turbine blades 44. Torque converter 14 also includes a stator 46 axially between turbine 40 and impeller 37 to redirect fluid flowing from the turbine blades 44 before the fluid reaches impeller blades 39 to increase the efficiency of torque converter 14. Torque converter 14 further includes a damper assembly 48 fixed to turbine shell 42. Damper assembly 48 is configured for receiving torque from turbine shell 42 and transferring torque to the transmission input shaft. For transferring torque to the transmission input shaft, damper assembly 48 includes a support hub 50, which includes a splined inner circumferential surface for non-rotatably connecting to an outer circumferential surface of the transmission input shaft.

A friction material 52 is bonded onto a radially extending impeller facing surface of an outer radial extension 54 of turbine shell 42, which is radially outside of blades 44 and forms the engagement section of turbine 40, for engaging a radially extending wall 56 of impeller shell 38, which is radially outside of blades 39 and forms the engagement section of impeller shell 38. In other embodiments, instead of or in addition to being bonded to outer radial extension 54, friction material 52 may be bonded to radially extending turbine facing surface of radially extending wall 56, which is formed by frustoconical section 36b, or to one or more additional discs between radially extension 54 and wall 56. Regardless of whether friction material 52 is bonded to outer radial extension 54, radially extending wall 56 or one or more additional discs, friction material 52 is provided axially between extension 54 and wall 56 to selectively rotationally engage the engagement section of turbine piston 40 with the engagement section of impeller shell 38. Torque converter 14 receives torque input from hybrid drive unit 12 through fasteners 30 at front cover 34, which is transmitted to impeller 37. Impeller 37 drives turbine 40 via fluid flow from impeller blades 39 to turbine blades 44, when the lockup clutch is disengaged, or via friction material 52, when the lockup clutch is engaged. Turbine 40 then drives damper assembly 48, which in turn drives the transmission input shaft.

Hybrid module 10 further includes at least one drive baffle blade 60 fixed to housing 26 and extending axially from housing 26 along a length of electric motor 16 onto torque converter 14. In this embodiment, hybrid module 10 includes two baffle blades 60. Each baffle blade 60 is fixed cantileveredly to housing 26 and includes a base 62 that is fixed to housing 26 and a blade portion 64 extending axially from base 62. Base 62 includes a flange 66 that protrudes circumferentially from blade portion 64 on both sides and includes at least one hole 67 passing axially therethrough for at least one fastener 68 to pass through. Housing 26 also includes a flange 70 axially abutting flange 66, with flange 70 also being provided with a hole 70a passing axially therethrough for receiving fastener 68. Flange 70 may include threads for engaging threads of fastener 68 such that fastener 68 is engaged with housing 26 to hold baffle blade 60 in place on housing 26. Blade portion 64 includes two tabs, including a first tab 72 at a free or distal end 64a thereof and a second tab 74 positioned between first tab 72 and base 62.

Blade portion 64 includes an axially extending radially outer surface 64b that tapers radially inward while extending axially, and an axially extending radially inner surface 64c configured for resting on drive unit 16 and torque converter 14. Tabs 72, 74 both protrude radially inward from inner surface 64c. Tab 74 extends radially into a space 76 formed axially between front cover 34 and stator 22. More specifically, space 76 is defined axially between frustoconical section 34b and a rear axially facing surface 22a of stator 22. Tab 72 extends into a space 78 on a transmission facing side of rear cover 36. More specifically, tab 72 extends into axial alignment with frustoconical portion 36b on the transmission facing side thereof. Tab 72, on a torque converter facing side 72a thereof, contacts an exterior surface of radially extending wall 56—i.e., frustoconical portion 36b. Blade portion 64 includes a first section 80a axially between tabs 72, 74 and a second section 80b between tab 74 and base 62. First section 80a is arranged for contacting the outer circumferential surface of cover 32. More specifically, first section 80a is arranged for contacting the outer circumferential surfaces of axially extending portion 36a and axially extending portion 34a. First section 80a is stepped radially inward at inner surface 64c to contact both portions 34a, 36a. Second section 80b is arranged for contacting the outer circumferential surface 22b of stator 22. Accordingly, blade portion 64 is configured for disrupting fluid flow radially outside of drive unit 16 and torque converter 14. Tab 72 is arranged and configured to disrupt fluid flow in space 78, tab 74 is arranged and configured to disrupt fluid flow in space 76, first section 80a is arranged and configured to disrupt fluid flow radially outside of axially extending portions 34a, 36a and second section 80b is arranged and configured to disrupt fluid flow radially outside of stator 22.

Figure 2:
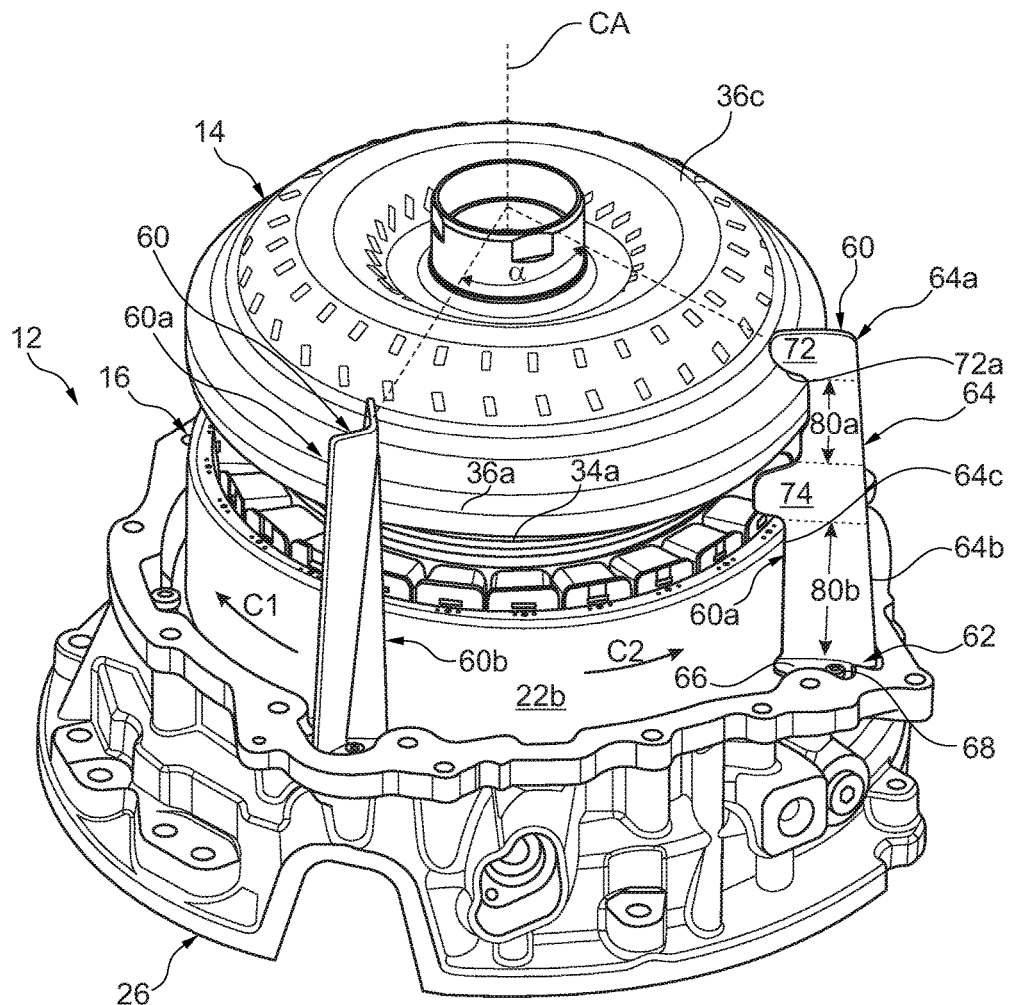
FIG. 2 shows a perspective view of the hybrid module shown in FIG. 1.

FIG. 2 shows a perspective view of hybrid module 10 shown in FIG. 1, illustrating two baffle blades 60 fixed housing 26. Blades 60 are spaced from each other by an angle α with respect to center axis CA, with angle a being calculated from the circumferential centers of blades 60. In this embodiment, blades 60 are configured in the exact same manner such that a first circumferential facing surface 60a, which is smooth and configured for disrupting the fluid flow of each blade 60, faces in a first circumferential direction C1 for both blades. A second circumferential facing surface 60b of each blade 60 is provided with support structure, which is discussed further below with respect to FIGS. 3a, 3b and 4.

Figures 3A, 3B:
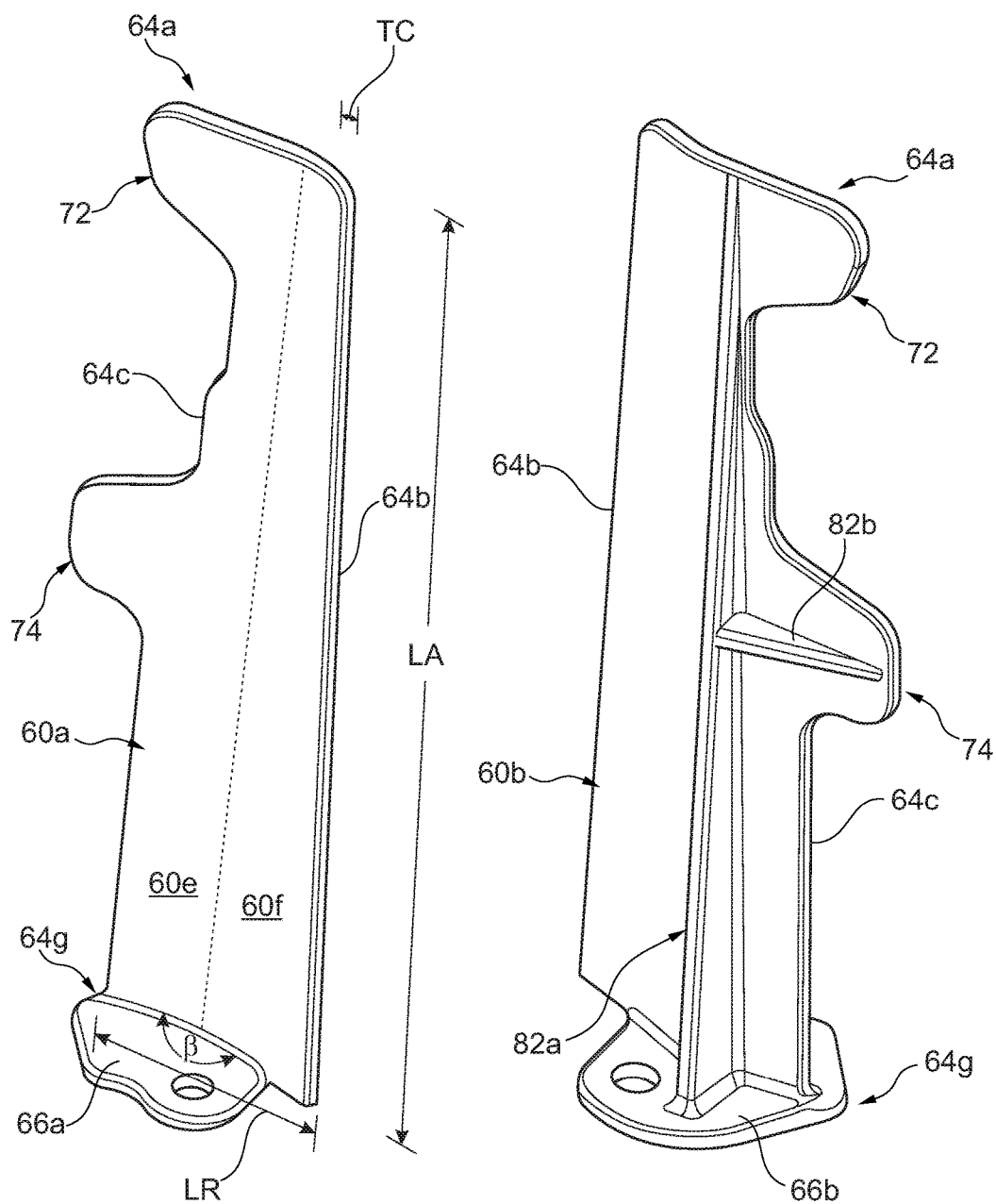
FIGS. 3a and 3b show perspective views of one blade of the hybrid module in accordance with an embodiment of the present invention.

FIG. 3a shows a perspective view of one blade 60 from circumferential facing surface 60a and FIG. 3b shows a perspective view of one blade 60 from circumferential facing surface 60b. Flange 66 includes a first section 66a protruding past surface 60a of blade portion 64 in the first circumferential direction C1 (FIG. 2) and a second section 66b protruding past surface 60a of blade portion 64 in the second circumferential direction C2 (FIG. 2). As shown in FIGS. 3a, 3b, blade portion 64 is substantially planar and has an axial maximum length LA that is substantially greater than a radial maximum length LR, with the radial length LR being substantially greater than a circumferential thickness TC. As shown in FIG. 3a, blade portion 64 includes a bend 64d dividing blade portion 64 into a radially inner section 64e and a radially outer section 64f that meet at bend 64d, which extends axially from flange 66 to free end 64a. At the base end 64g of blade portion 64, sections 64d, 64e join flange 66 and are angled at an obtuse angle β with respect to each other. As shown in FIG. 3b, blade 60 is provided with a support structure at surface 60b in the form of an axially extending rib 82a protruding axially from flange section 66b and a radially extending rib 82b extending radially from rib 82a into tab 74. Ribs 82a, 82b provide additional rigidity to baffle blade 60.

Figure 4:
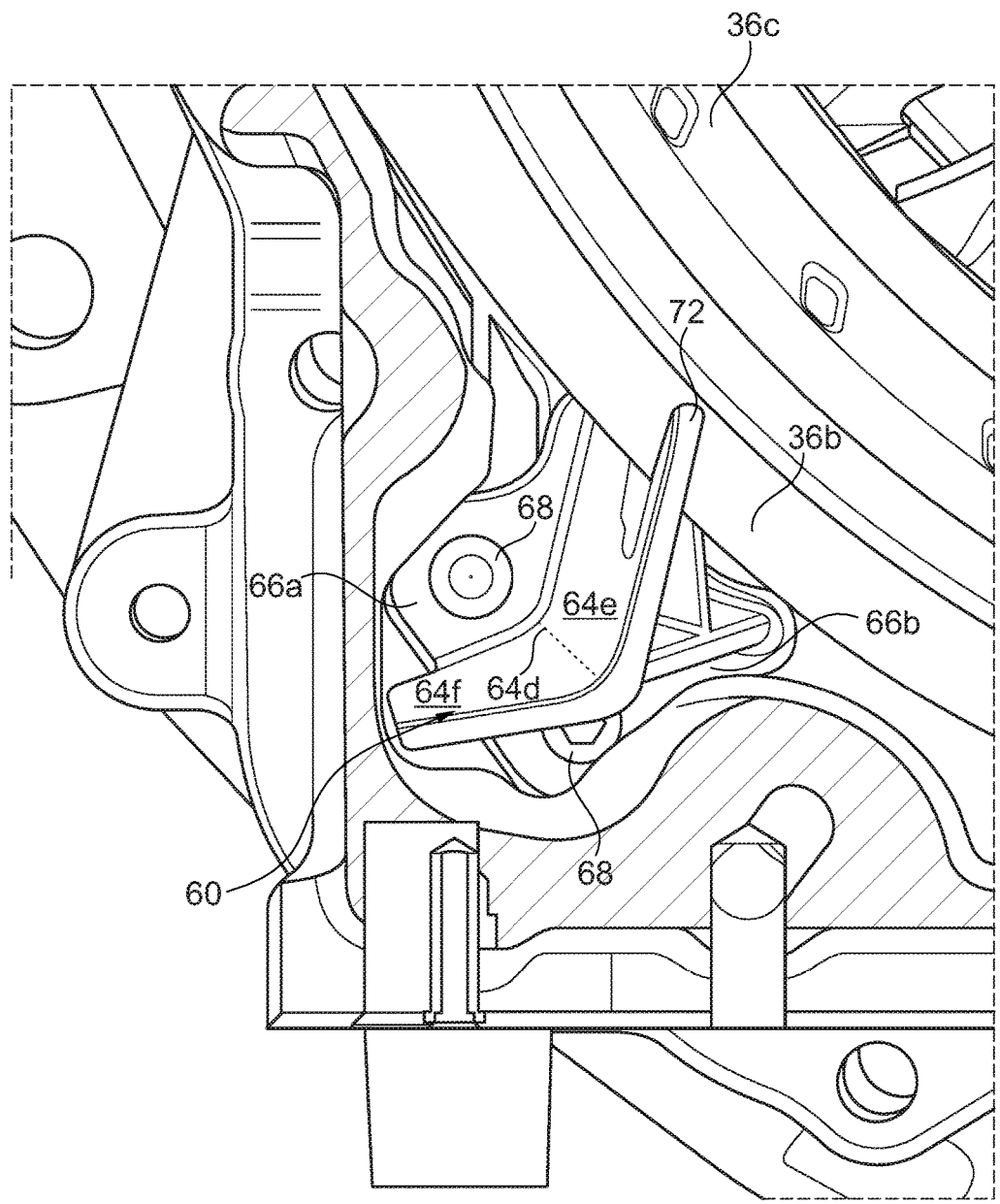
FIG. 4 shows a view of one baffle blade along A-A in FIG. 1.

FIG. 4 shows a view of baffle blade 60 along A-A in FIG. 1. FIG. 4 shows tab 72 contacting frustoconical portion 36b of rear cover 36. Two fasteners 68 pass through flange 66 to fix blade 60 to housing 26, with one fastener 68 passing through section 66a and the other fastener 68 passing through section 66b. FIG. 4 illustrate bend 64d dividing blade portion 64 into two sections 64e, 64f.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
12 hybrid drive unit
14 torque converter
16 electric motor
18 engine connect/disconnect clutch
20 input shaft
22 stator
22a rear axially facing surface
22b outer circumferential surface
24 rotor
24a magnet segments
26 housing
28 rotor carrier
28a cylindrical axially extending section
28b radially extending section
30 fasteners
32 cover
34 front cover
34a axially extending portion
34b frustoconical section
34c intermediate axially extending portion
34d radially extending central portion
36 rear cover
36a axially extending portion
36b frustoconical section
36c rounded blade supporting portion
37 impeller
38 impeller shell
39 impeller blades
40 turbine
42 turbine shell
44 turbine blades
46 stator
48 damper assembly
50 support hub
52 friction material
54 outer radial extension
56 radially extending wall
60 baffle blade
60a first circumferential facing surface
60b second circumferential facing surface
62 base
64 blade portion
64a free end
64b axially extending radially outer surface
64c axially extending radially inner surface
64d bend
64e radially inner section
64f radially outer section
64g base end
66 flange
66a first flange section
66b second flange section
67 hole
68 fastener
70 housing flange
70a hole
72 first tab 72a torque converter facing side
74 second tab
76 space
78 space
80a blade portion first section
80b blade portion second section
82a axially extending rib
82b radially extending rib

What is claimed is:

1. A hybrid module configured for arrangement in a torque path upstream from a transmission and downstream from an internal combustion engine, the hybrid module comprising:
    a drive unit including an electric motor and a housing;
    a torque converter connected to the electric motor; and
    at least one baffle blade extending axially from the housing radially outside of the electric motor and the torque converter.

2. The hybrid module as recited in claim 1 wherein the at least one baffle blade includes a first baffle blade and a second baffle blade, the first and second baffle blades being spaced circumferentially from each other.

3. The hybrid module as recited in claim 1 wherein the at least one baffle blade includes a base fixed to the housing and a blade portion extending axially from the base.

4. The hybrid module as recited in claim 3 wherein the blade portion includes a radially outer surface, a radially inner surface and at least one tab extending radially inward from the radially inner surface.

5. The hybrid module as recited in claim 4 wherein the at least one tab includes a first tab positioned on a transmission facing side of a portion of a rear cover of the torque converter.

6. The hybrid module as recited in claim 5 wherein the first tab contacts a radially extending wall of the rear cover.

7. The hybrid module as recited in claim 5 wherein the at least one tab includes a second tab positioned axially between a stator of the electric motor and a portion of a front cover of the torque converter.

8. The hybrid module as recited in claim 4 wherein the radially inner surface of the blade portion contacts an outer circumferential surface of the electric motor.

9. The hybrid module as recited in claim 4 wherein the radially inner surface of the blade portion contacts an outer circumferential surface of a cover of the torque converter.

10. The hybrid module as recited in claim 4 wherein the blade portion includes a circumferentially facing surface extending from the radially inner surface to the radially outer surface.

11. A method of constructing a hybrid module configured for arrangement in a torque path upstream from a transmission and downstream from an internal combustion engine, the method comprising:
    providing a drive unit including an electric motor and a housing;
    connecting a torque converter to the electric motor; and
    fixing at least one baffle blade to the housing such that the at least one baffle blade extends axially from the housing radially outside of the electric motor and the torque converter.

12. The method as recited in claim 11 wherein the fixing of the at least one baffle blade to the housing includes fixing a first baffle blade and a second baffle blade to the housing, the first and second baffle blades being spaced circumferentially from each other.

13. The method as recited in claim 11 wherein the at least one baffle blade includes a base fixed to the housing and a blade portion extending axially from the base, the blade portion including a radially outer surface, a radially inner surface and at least one tab extending radially inward from the radially inner surface.

14. The method as recited in claim 13 wherein the at least one tab includes a first tab positioned on a transmission facing side of a portion of a rear cover of a cover of the torque converter.

15. The method as recited in claim 14 wherein the at least one tab includes a second tab positioned axially between a stator of the electric motor and a portion of a front cover of the cover of the torque converter.

16. The method as recited in claim 15 wherein the at least one baffle is fixed to the housing such that the first tab contacts a radially extending wall of the rear cover, the radially inner surface of the blade portion contacts an outer circumferential surface of the electric motor and the radially inner surface of the blade portion contacts an outer circumferential surface of the cover of the torque converter.

17. The method as recited in claim 13 wherein the blade portion includes a circumferentially facing surface extending from the radially inner surface to the radially outer surface.

* * * * *